United States Patent [19]

Ethier

[11] Patent Number: 4,625,825

[45] Date of Patent: Dec. 2, 1986

[54] FRONT-DRIVE THREE-WHEELS VEHICLE WITH TANDEM DRIVE AND PASSENGER

[76] Inventor: Pierre M. Ethier, 36 Des Castels, Lauzon, Quebec, Canada, G6V 2B7

[21] Appl. No.: 824,312

[22] Filed: Jan. 31, 1986

Related U.S. Application Data

[63] Continuation of Ser. No. 587,930, Mar. 9, 1984, abandoned.

[30] Foreign Application Priority Data

Mar. 21, 1983 [CA] Canada ................................. 424020

[51] Int. Cl.4 .............................................. B62D 61/06
[52] U.S. Cl. ..................................... 180/211; 180/215
[58] Field of Search ................ 180/210, 211, 212, 213, 180/214, 215, 216, 217

[56] References Cited

U.S. PATENT DOCUMENTS

| | | | |
|---|---|---|---|
| 2,376,419 | 5/1945 | Cole | 180/215 |
| 3,738,440 | 6/1973 | Storm | 180/13 |
| 4,351,410 | 9/1982 | Townsend | 180/210 |
| 4,453,763 | 6/1984 | Richards | 296/185 |

FOREIGN PATENT DOCUMENTS

| | | | |
|---|---|---|---|
| 572789 | 4/1931 | Fed. Rep. of Germany | 180/215 |
| 723564 | 4/1932 | France | 180/215 |
| 330043 | 6/1930 | United Kingdom | 180/211 |

*Primary Examiner*—Louis J. Casaregola
*Attorney, Agent, or Firm*—Larson & Taylor

[57] ABSTRACT

The present invention consists of a three-wheels vehicle having two front driving and steering wheels, and an engine ahead of these two wheels to counterweight the driver and passenger sitting in tandem, in order to bring the vehicle-occupants center of gravity close to these two front wheels which are alone to limit roll-over danger in curves at high speeds. Such a lay-out presents an outstanding set of advantages: weight up front for safety in collisions, stability at high speeds, traction and steerability in mud, sand or snow; and still small for ease of driving and parking, low fuel consumption and pollution, and low purchasing and operating costs.

11 Claims, 2 Drawing Figures

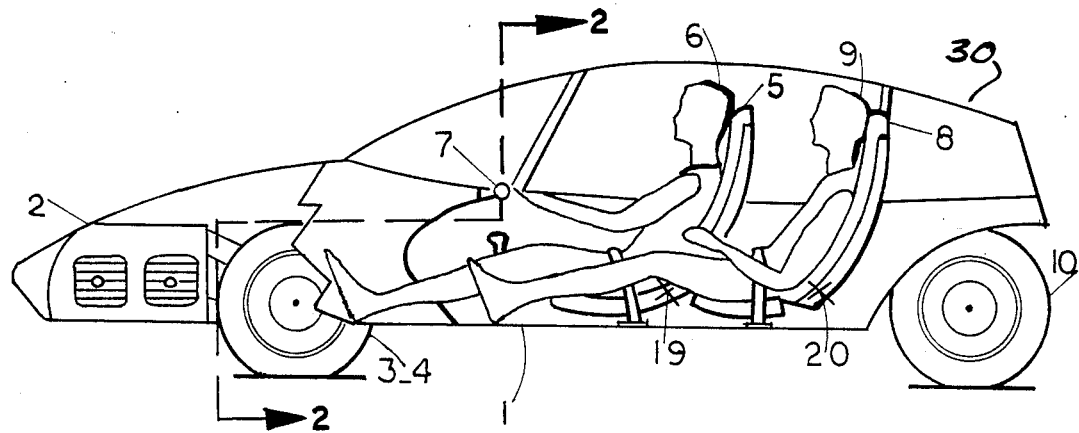
FIGURE _1_
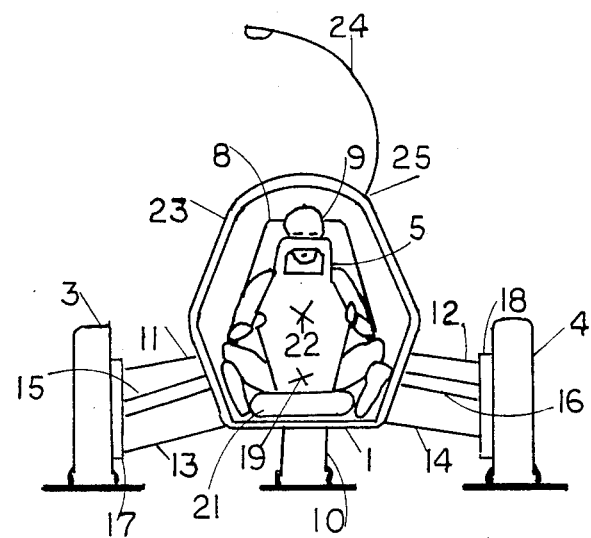
FIGURE _2_

FRONT-DRIVE THREE-WHEELS VEHICLE WITH TANDEM DRIVE AND PASSENGER

This application is a continuation of application Ser. No. 587,930 filed Mar. 9, 1984 (abandoned), entitled FRONT-DRIVE THREE-WHEELS VEHICLE WITH TANDEM DRIVER AND PASSENGER.

BACKGROUND OF THE INVENTION

This invention relates to motorized three-wheel vehicles having a front engine, two driving and steering front wheels, and a single rear wheel.

Canadian and American patents of the turn of the century disclose such motorized three-wheel vehicles. But these vehicles are heavy farm tractors will all-steel wheels, without suspension and with a high center of gravity. They were designed for farm work and they cannot be utilized on roads at high speeds.

More recently, a sort of three-wheel vehicle much better suited for road driving was derived to be used as a sports car. The vehicle has a front engine driving two front wheels which can also be steered to the right or left in order to steer the vehicle on the road. Thus, these two front wheels drive and steer the vehicle, exaclty like the two front wheels of a front-engine and front-drive four-wheel car. Furthermore, this three-wheel vehicle has two side-by-side seats behind the two front wheels, and it only has one rear wheel which is non-driving and non-steerable.

Such a three-wheel vehicle has a higher proportion of its weight on the two front wheels, than a front-engine front-drive four-wheel car, which already has a higher proportion of its weight on the two driving wheels than a standard front-engine rear-drive four-wheel car. This high weight proportion on the front wheels provides for more protection of the occupants in front-end collisions. It also provides more straight ahead stability against side-wind gusts at medium and high speeds. And it provides for excellent traction and steerability in snow, even better than that of front-engine front-drive four-wheel cars.

The problem with such a three-wheel vehicle is that the occupants enclosure must be as wide as for a conventional four-wheel car in order to sit these occupants side by side. And the width of the front wheel track must be even wider than that of such a conventional four-wheel car since the two front wheels of a three-wheel vehicle are the sole means for providing stability against roll-over in curves at high speeds. Thus, this three-wheel vehicle is very wide, which limits its ability to park or circulate in urban traffic and which increases its frontal area, thus increasing the aerodynamic drag and fuel consumption.

One could think of modifying this three-wheel vehicle by using the front and rear seat lay-out of a conventional four-wheel car to reduce the width of the occupants enclosure. The problem with this lay-out is that the driver has to be seated more towards the rear, behind the trasmission which is located in between the two front wheels, and the passenger has to be seated even more towards the rear to provide him with sufficient leg room. Thus, the vehicle-occupants center of gravity is shifted towards the rear wheel which plays no role in providing stability against roll-over. So the track width has to be even wider to provide the necessary stability against roll-over, for road driving. In other words, there is no obvious modification that may be brought to obtain a simple, small, low cost and still safe vehicle.

SUMMARY OF THE INVENTION

Considering the heavy and slow tractors of the turn of the century, the creative idea consists in keeping and adapting for road travelling, the front engine, the two driving and steering front wheels, and the single rear wheel. Furthermore, the creative idea also consists of eliminating the seat located high above the ground and at the rearmost portion of the vehicle for better control of the agricultural equipments. Instead, the creative idea consists of introducing the idea of low seats having a backrest and located up front one behind the other, immediately behind the engine and the two front wheels, in order to lower and bring forward the vehicle-occupant center of gravity which leads to a vehicle-occupant center of gravity having extremely interesting characteristics as compared to these heavy and slow tractors.

Considering that the three-wheel vehicle is much better suited for road driving, the creative idea consists in again keeping the front engine, the two driving and steering front wheels, and the single rear wheel. But the creative idea also consists of getting away from the idea of front-engine and front-drive four-wheel car with two of the occupants sitting side-by-side at the front, or it consists of getting away from the idea of a typical sports car with two occupants side-by-side, or away from the idea of the front and rear occupant lay-out of typical automobiles. Instead, the creative idea consists of using a concept relevant to planes and gliders; it consists in laying out the transmission in between the legs of the driver and the driver in between the legs of the passenger, which are thus in tandem. With this lay-out, which is unusual for a four-wheel car, the driver and passenger can be seated more up-front of the vehicle, to bring the vehicle-occupant center of gravity closer to the two front wheels to provide the necessary stability against roll-over in curves at high speeds.

(1) This idea leads to a novel three-wheel vehicle which is a safer means of transportation because:
  (a) the driver and passenger may be restrained by seat belts in a protective structure;
  (b) the engine is at the front instead of at the rear to prevent the passenger and the driver from being crushed by said engine in a frontal collison;
  (c) the driver and the passenger sit in the middle of the vehicle instead of on each side, which provides more safety since the front wheels will generally be crushed before the protective body structure in lateral collisions;
  (d) because of the front engine, the driver is relatively far behind the front bumper which provides him with as much safety potential as with front-drive four-wheel car;
  (e) the passenger is even better protected in frontal collisions since he is even farther behind the front bumper because he is sitting behind the driver, and since he will be held by the front backrest in case he did not buckle-up his seat belt;
  (f) although this three-wheel vehicle is small and may be less visible than a conentional automobile, if it does not have light reflecting components or if the law does not enforce headlights to be on, it represents a smaller "target" than a conventional automobile for other vehicles that may hit it frontward or backward;

(g) the weight of the power-train at the front brings better high speed stability against crosswinds and more capability to go where intended on snowy roads, which contributes to safer driving.

(2) This novel three-wheels vehicle is small, simple and lightweight, so that:
   (a) it is less costly to buy;
   (b) it costs less in fuel consumption, because of its reduced frontal surface area and because of its elongated aerodynamic body of air-plane fuselage type;
   (c) because of its low fuel consumption, it is less air-pollutant than conventional automobiles, as long as the same anti-pollution systems are installed;
   (d) because of its small size and because the widest parts of the vehicle are the front wheels which can easily be seen by the driver, it is easier to drive accurately and park in tight situations, while still having the excellent road holding capabilities of front-engine front-drive four-wheels cars.

(3) And this novel three-wheel vehicle is very well adapted for snowy road driving, because:
   (a) up to 75% of the weight of the vehicle is on the two front driving and steering wheels, which insures excellent driving and traction in snow, even better than for front-drive automobiles which only have 60% of their weight on the front wheels, and obviously better than for front-engine front-drive automobiles which only have about 40% of their weight on their driving wheels;
   (b) the vehicle body is narrower than conventional automobile bodies, which makes it easier to remove the snow under it when the vehicle is jacked up and stalled over that snow, and which provides for less drag in snow when the vehicle is still moving, to permit steeper hill climbing;
   (c) it is even easier to get the vehicle out of the snow when it is stalled, because with similar tires and ground clearance as for conventional automobiles, it is lighter to push out and it is sufficiently light at the rear to be hand lifted when the occupants are out, and be turned around to go in another direction.

BRIEF DESCRIPTION OF THE DRAWINGS

Concerning the drawings which illustrate an embodiment of the invention, FIG. 1 illustrates a side view of said embodiment of the invention, in which a portion of the left side was omitted to better show the driver and passenger. And FIG. 2 illustrates a sectional view in the direction of arrows 2—2 of FIG. 1, without the driver and the differential or transmission to better show the interior of the passenger compartment, the front backrest and the passenger sitting behind it.

DESCRIPTION OF THE PREFERRED EMBODIMENT

FIG. 1 shows a chassis 1 supporting the engine 2 at the front, two front wheels 3 and 4, and an occupant section having a front seat 5 on which the driver 6 sits and steers the vehicle with handlebars 7, a rear seat 8 on which the passenger 9 sits, and a rear wheel 10. The occupant section may be an enclosed compartment, if desired, as represented by outline 30.

FIG. 2 shows that said chassis 1 is supported at the front over said front wheels 3 and 4, by means of upper suspension arms 11 and 12, and lower suspension arms 13 and 14. This FIG. 2 also shows transmission shafts 15 and 16 which transmit motion from engine 2 to the two front wheels 3 and 4 to drive the vehicle forward or backward. And it shows more or less vertical pivots 17 and 18 which provide means to turn said front wheels 3 and 4 to the right or left, to steer the vehicle on the ground.

Thus, this embodiment of the invention constitutes a three-wheel vehicle having a front engine 2, having two driving and steering front wheels 3 and 4, having a single rear wheel 10, and accomodating a driver 6 and a passenger 9 sitting in tandem one behind the other behind engine 2.

As illustrated in FIG. 1, passenger 9 sits with his legs extended along each side of driver 6, which permits passenger 9 to be seated closer to the front than if its legs could only go behind front seat 5. In practice, the distance between the bottom 19 of the backrest of front seat 5, and the bottom 20 of the backrest of rear seat 8 is reduced to about 30 to 65 centimeters (12 to 26 inches). Thus, the length of chassis 1 may be much shorter and the center of gravity of the vehicle-occupant system may be brought forward closer to the front wheels 3 and 4 which are the sole means to avoid roll-over in curves at high speeds. So the vehicle may have a higher safety margin against roll-over or it may have a narrower track of said front wheels 3 and 4, to increase the ease of driving and parking in urban traffic.

And, as illustrated in FIG. 2, chassis 1 forms a space on each side of front seat 5 to let passenger 9 stretch his legs along each side of this front seat 5. Also, the bottom part 21 of this front seat 5 is narrow in order to save more space for the legs of passenger 9 without the need for a wider passenger compartment, which leads to a reduced frontal surface area, a reduced aerodynamic drag and a reduced fuel consumption. Moreover, the lower portion 19 of the backrest of said front seat 5 is even narrower than the top portion 22 thereof to avoid passenger 9 from having to uncomfortably widen his legs.

Finally, as illustrated in FIG. 2, chassis 1 forms with roll-bar 23, a protective structure for the occupants against collisions or possible roll-overs. Also, as again illustrated in this FIG. 2, the proximity of the two occupants and the narrow shape of chassis 1 permits the use of a single seagull-type access door 24 opening around hinges 25 for lower costs and better aesthetic or futuristic look.

While a precise embodiment of the present invention has been shown and described, it is obvious that changes and modifications may be made without departing from this invention in its broader aspects. For instance, the creative idea also applies to a three-wheel vehicle similar to the one shown in FIGS. 1 and 2, but having a luggage space instead of a rear seat, said space being easily adapted to accomodate a passenger essentially as exposed in the embodiment. Also, such elements as a spare tire over the differential, a luggage space behind the passenger, or a flat internal combustion engine may be added to this three-wheels vehicle to make it even more useful.

The embodiments of the invention, for which exclusive rights of property and privilege are claimed, are defined as follows:

1. A motorized vehicle comprising:
   a chassis,
   a pair of front wheels located essentially symmetrically to the right and left of the chassis, and a single rear wheel, the chassis being supported on said front wheels and said rear wheel, an engine power source mounted on said chassis at the front portion of the vehicle, said engine power source having its center of gravity located forward of the center of gravity of said two front wheels, a transmission means for operatively connecting said engine power source to said front wheels to drive said front wheels, steering means for steering the front wheels, said steering means including means positioned to be operated by a driver of the vehicle, an occupant section extending rearwardly from said front portion and having a driver's seat located rearwardly of the engine and located essentially equidistantly from each of said front wheels, a passenger seat located behind the driver's seat, both seats being along the front to rear centerline of the vehicle, each of said driver's seat and passenger seat having a bottom portion and a backrest, and including a space between the bottom portion of the driver's seat and adjacent sides of the occupant section, which space extends essentially along the length of the bottom portion of the driver's seat to provide a space alongside the driver's seat for the legs of a passenger seated on the passenger seat.

2. A motorized vehicle according to claim 1, wherein the bottom portion of the driver's seat is transversely narrower than the maximum transverse width of the backrest of the driver's seat.

3. A motorized vehicle according to claim 2, wherein the backrest of the driver's seat is transversely narrower at its lower part than at said maximum transverse width which is located above the said lower part.

4. A motorized vehicle according to claim 3, wherein the transverse distance across the bottom portion and across the bottom part of the driver's seat are generally the same.

5. A motorized vehicle according to claim 1, said occupant section having a protective structure means to protect against collapse in the event that the vehicle rolls over.

6. A motorized vehicle according to claim 1, the longitudinal-horizontal distance between corresponding points of the brackrest of the driver's seat and of the passenger's seat being in the range from 30 to 60 centimeters.

7. A motorized vehicle according to claim 1, said single rear wheel having means restraining its motion essentially to an up and down movement to provide suspension means, in addition to its rotational movement along the ground.

8. A motorized vehicle according to claim 1, wherein the occupant section is an enclosed compartment.

9. A motorized vehicle according to claim 1, wherein the backrest of the driver's seat is transversely narrower at its lower part than at said maximum transverse width which is located above the said lower part.

10. A motorized vehicle according to claim 1, the bottom portion and backrest of the driver's seat being shaped to comfortably receive the legs of the rear seat passenger alongside thereof.

11. A motorized vehicle according to claim 1, wherein the transverse width of the lower part of the driver's seat backrest is narrower than the maximum transverse width of the driver's seat bottom portion.

* * * * *